June 25, 1946. W. SUMMERBELL 2,402,693
THREADLESS RETAINER
Filed March 10, 1944
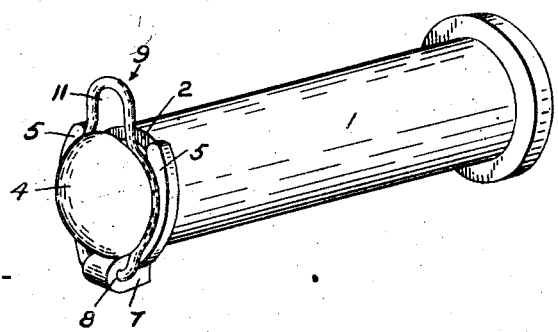
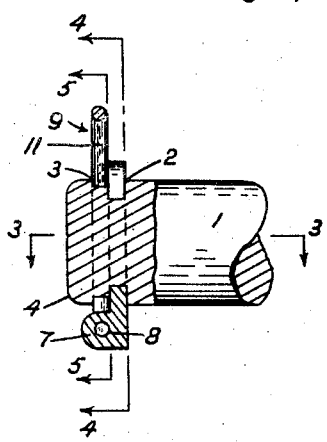
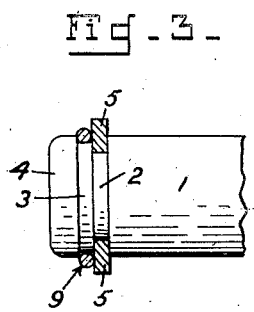
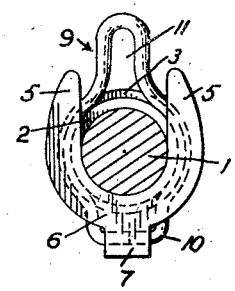
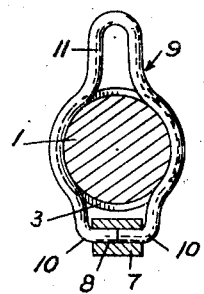
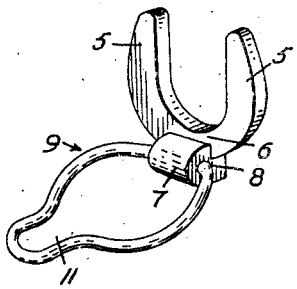
Inventor
William Summerbell Patented June 25, 1946

2,402,693

UNITED STATES PATENT OFFICE 2,402,693

THREADLESS RETAINER

William Summerbell, Washington, D. C.

Application March 10, 1944, Serial No. 525,858

1 Claim. (Cl. 85—8)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a threadless fastener for a bolt or other machine element and more particularly to such a fastener which will securely confine various elements against longitudinal movement on bolts, shafts, or the like, while being capable of ready and convenient removal.

Such confinement of machine elements is commonly provided by the employment of threaded members engaging the shaft or bolt with or without the addition of cotter pins passed through diametral holes in the shaft or bolt. Cotters and similar devices also have been used to retain machine elements without the interposition of a threaded retainer.

The principal disadvantage of the use of the conventional split cotter pin has been that only the comparatively small cross section of the pin opposed longitudinal movement along the shaft or the like and only light thrust loads could be resisted without shearing of the pin. Other disadvantages of the common cotter pin are found in the fact that such devices cannot generally be reused and by reason of the sharp exposed ends are apt to injure any body member in proximity to a rotating part secured thereby.

Numerous attempts have been made to avoid these disadvantages by the use of a variety of spring cotters or other keys secured to a bolt or shaft but such devices have generally been unsuitable for parts which may need frequent removal or are subject to severe shocks, particularly along diametral lines.

It is, therefore, an object of this invention to provide a retainer which is capable of ready removal, is safe to use, and cannot be accidentally dislodged by any shocks which may be applied to the bolt or shaft. Such a retainer has a particularly important function in securing various parts on the reciprocating members of cannon or other military machines.

The exact nature of the invention, as well as other objects and advantages thereof, will clearly appear from the description of a preferred embodiment shown in the accompanying drawing in which:

Fig. 1 is a pictorial view of a bolt employing my improved retainer.

Fig. 2 is a side elevational view of such a bolt, the end of the bolt and the retainer being shown in diametral section.

Fig. 3 is a top plan view of the end of such a bolt, the retainer being sectioned on the line 3—3 of Fig. 2.

Fig. 4 is a cross sectional view on the line 4—4 of Fig. 2.

Fig. 5 is a similar view on the line 5—5 of Fig. 2.

Fig. 6 is a pictorial view of the retainer proper.

Referring to the drawing by characters of reference, there is shown a bolt comprising a shank 1 which has been provided near its end with a circumferential groove 2. A circumferential groove 3 is of less depth than the groove 2 and is located between the groove 2 and the end of the bolt shank 1. Preferably the end of the shank will be somewhat rounded as at 4.

The retainer proper comprises a bifurcated key member having a pair of parallel legs 5 spaced apart by a distance equal to the diameter of the bottom of the groove 2 and adapted to be received therein in straddling relation. The closed end 6 of the bifurcated key member is provided with a lug 7 in which a bore 8 is formed in substantially parallel relation to a tangent to the inner curved surface of the closed end of the bifurcated retainer. As will be more fully pointed out later this relationship assures the best operation of the retainer assembly, although for many purposes it would be satisfactory if the lug 7 were located on one or the other of the legs 5.

A retaining clip 9 is formed in such a fashion as to exert a snug gripping action upon the bottom of the shallow groove 3 and has its end portions 10 turned inwardly for reception in the bore 8. The closed side of the retaining clip 9 is preferably formed to provide the finger like extension 11 which serves to increase the flexibility of the gripping action upon the shallow groove and to provide a convenient means of grasping the retaining clip for operation of the clips.

The circumferential grooves should be located near enough to the end of the shaft to permit the retaining clip to swing through an arc having its center in the bore 8 over the rounded end 4 of the shank into engagement with the shallow groove 3. The rounded position 4 will have a wedgelike engagement with the retaining clip 9 and will spread the end portions 10 a sufficient amount to permit passing over the full size portion of the shank between the end of the shank and the shallow groove 2 into a position to snap into engagement with the shallow groove 3.

From the foregoing description it should be obvious that application of the retainer involves only the simple steps of placing the bifurcated key member on the shank with the parallel legs received in straddling relation in the groove 2 and then swinging the retainer about its pivot through a position in which it is wedged open by the rounded end of the shank to a position in which it snaps into engagement with the shallow groove. Removal of the retainer requires only a reversal of the operations just described and is readily accomplished since the finger-like extension 11 may be readily grasped.

It will be obvious that as long as the bifurcated key member remains in engagement with the groove 2 that endwise removal of parts from the shank may be opposed by a force equal to that necessary to shear out the entire portion of the retainer received in the groove.

As previously pointed out it is particularly desirable to provide the lug 7 on the closed end of the bifurcated key member. With this relationship of the parts the open side of the key member when assembled in the groove 2 will be complete by the closed side of the retaining clip 9 which is engaged in the shallow groove 3. By reason of this inter-relation of the parts it will be seen to be practically impossible for the key member to be inadvertently jarred or shaken from a secure retaining relationship.

A shock-proof retainer is of considerable utility in many fields and particularly so in connection with the implements of modern war, where readily released but positively acting retaining devices have a wide application. For example, a bolt of the type shown might be used to secure the breech lugs of a cannon to the eye in the end of the recoil piston. In such a case the axis of the bolt would be substantially normal to the line along which the breech lugs reciprocate in recoil and counter recoil. As is well known, the forces of inertia are relatively high during such violent reciprocation. Such parts are also subject to severe vibration and road shocks when the weapon is moved at high velocity over rough terrain. From a military point of view it is essential that such a securing device be absolutely positive and it is desirable that it be possible to remove the securing means readily without the use of tools and possibly in the dark or in some location which would not permit the use of a wrench to release the conventional securing means.

The utility of the subject invention is by no means limited to its use as a bolt retaining member as it is equally useful for retaining machine elements on a shaft or other similar member. Rotation or reciprocation of the member or machine element secured thereon will not be effective to release the retaining member.

I claim:

In combination, a bolt or the like having a circumferential circular groove near one end, a circumferential circular rabbet immediately adjacent said groove forming a shoulder therewith, said rabbet lying nearer to said end than said groove, a retainer comprising a plate slotted to lie in the groove in straddling relation and adapted to be rotatably moved thereon, said plate being retained against axial movement toward said end by said shoulder, and a spring member mounted on the plate having side contours conforming to the shape of the circumferential rabbet and adapted to be wedged over the end of said bolt into rotatable engagement with said rabbet, whereby said plate may be retained against lateral displacement from the groove at any radial position with respect to said bolt.

WILLIAM SUMMERBELL.